US012695700B2

(12) United States Patent
Zhang et al.

(10) Patent No.: US 12,695,700 B2
(45) Date of Patent: Jul. 28, 2026

(54) TRAFFIC SCHEDULING METHOD, APPARATUS, DEVICE, STORAGE MEDIUM, AND PROGRAM PRODUCT

(71) Applicant: Beijing Volcano Engine Technology Co., Ltd., Beijing (CN)

(72) Inventors: Zhongjun Zhang, Singapore (SG); Xiongchun Duan, Beijing (CN); Pengcheng Ma, Beijing (CN); Pengli Wang, Beijing (CN); Dingwen Zhang, Beijing (CN); Bin Liu, Beijing (CN)

(73) Assignee: BEIJING VOLCANO ENGINE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 19/241,118

(22) Filed: Jun. 17, 2025

(65) Prior Publication Data

US 2025/0385867 A1 Dec. 18, 2025

(30) Foreign Application Priority Data

Jun. 17, 2024 (CN) .......................... 202410780693.4

(51) Int. Cl.
*H04L 45/76* (2022.01)
*H04L 45/7459* (2022.01)
*H04L 61/4511* (2022.01)

(52) U.S. Cl.
CPC .......... *H04L 45/76* (2022.05); *H04L 45/7459* (2022.05); *H04L 61/4511* (2022.05)

(58) Field of Classification Search
CPC . H04L 45/76; H04L 45/7459; H04L 61/4511; H04L 45/741; H04L 61/2528;

(Continued)

(56) References Cited

U.S. PATENT DOCUMENTS

2003/0048804 A1 3/2003 Inouchi et al.
2016/0278001 A1 9/2016 Zhang et al.
(Continued)

FOREIGN PATENT DOCUMENTS

| CN | 111884902 A | 11/2020 |
| CN | 112272158 A | 1/2021 |
| CN | 112913196 A | 6/2021 |
| CN | 116170409 A | 5/2023 |
| WO | 2018208570 A1 | 11/2018 |

OTHER PUBLICATIONS

Liu et al., "Research on dynamic host allocation protocol technology", Network Communication Digitization user, No. 8, Aug. 8, 2013, 3 pages, with English Abstract.

(Continued)

*Primary Examiner* — Tonia L Dollinger
*Assistant Examiner* — Mehulkumar J Shah
(74) *Attorney, Agent, or Firm* — Astute IP Law Group

(57) ABSTRACT

The present disclosure relates to the field of network communication technologies and discloses a traffic scheduling method, an apparatus, a device, a storage medium, and a program product. The method includes: forwarding a domain name resolution request of a business application to a central domain name system, wherein the domain name resolution request carries a target domain name, and the central domain name system is configured to forward the domain name resolution request to a target egress gateway corresponding to the target domain name; receiving a first target network address and a gateway address of the target egress gateway that are fed back by the central domain name system; performing network address translation on the first target network address to obtain a virtual network address; and performing data transmission based on the virtual network address, the gateway address, and the first target network address.

20 Claims, 7 Drawing Sheets

(58) Field of Classification Search
CPC . H04L 61/59; H04L 61/2503; H04L 61/3025;
H04L 61/2521; H04L 61/3015; Y02D
30/50
See application file for complete search history.

(56) References Cited

U.S. PATENT DOCUMENTS

| | | |
|---|---|---|
| 2018/0159960 A1 | 6/2018 | Farrugia et al. |
| 2019/0245949 A1* | 8/2019 | Wang .................. H04L 41/0895 |
| 2021/0352045 A1 | 11/2021 | Kodavanty |
| 2022/0272019 A1* | 8/2022 | Zhou .................. H04L 61/4511 |
| 2023/0065919 A1 | 3/2023 | Smith |
| 2025/0286857 A1* | 9/2025 | Miglani .............. H04L 61/4511 |
| 2025/0300969 A1* | 9/2025 | Bailey .................. H04L 63/126 |

OTHER PUBLICATIONS

Peng et al., "Key technology and solution of intelligent resolution for the huge carrier DNS", Telecommunications Science, No. 1, Jan. 20, 2016, 5 pages, with English Abstract.
Qin et al., "Cloud sourcing domain name resolving service model", Journal on Communications, vol. 34, No. 2, Feb. 25, 2013, 9 pages, with English Abstract.
Notice to Grant Patent Right for Invention for Chinese Patent Application No. 202410780693.4, mailed on Jul. 19, 2024, 4 pages.
Extended European Search Report received for European Application No. 25161554.8, mailed on Jul. 28, 2025, 9 pages.

* cited by examiner

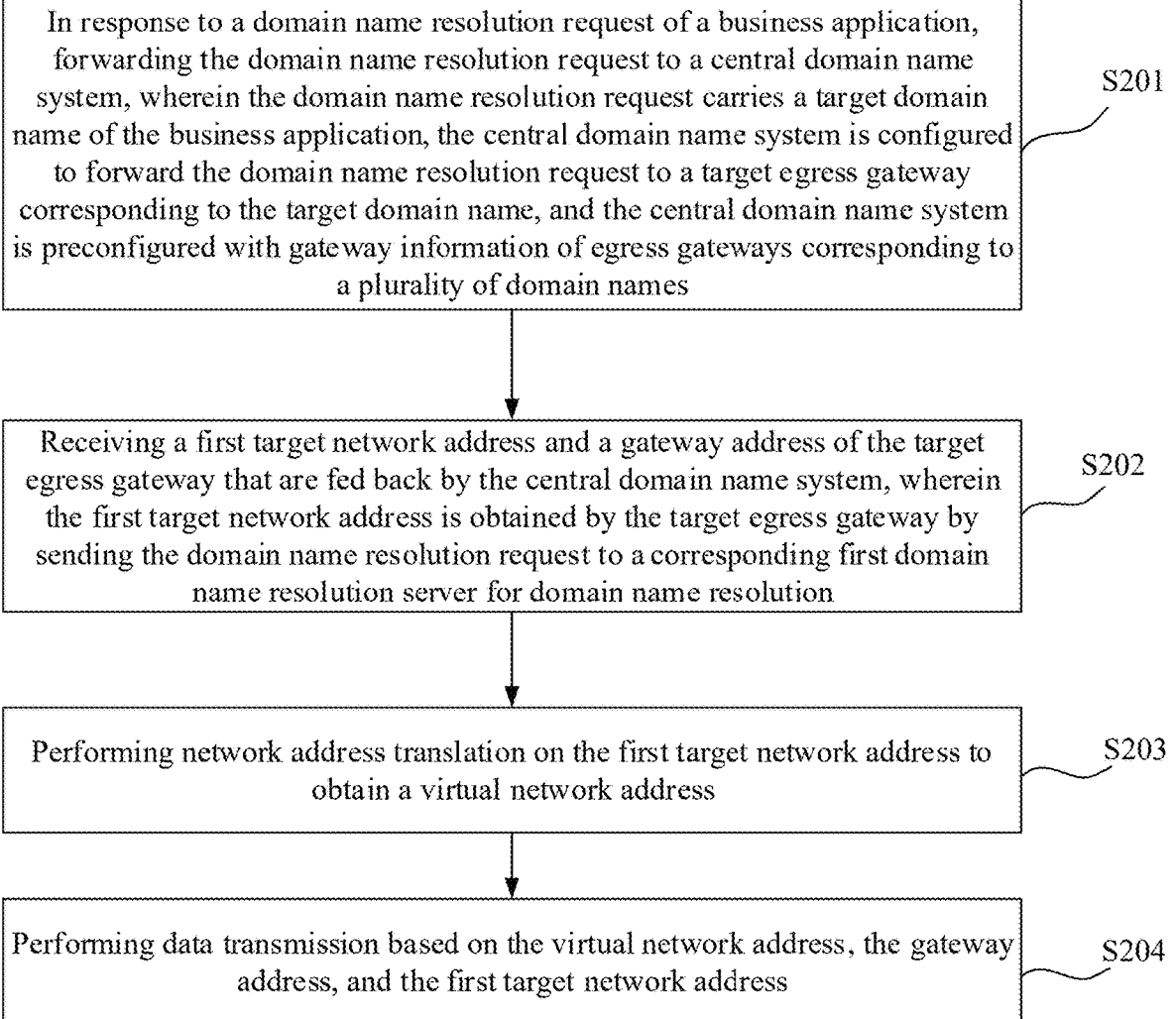

In response to a domain name resolution request of a business application, forwarding the domain name resolution request to a central domain name system, wherein the domain name resolution request carries a target domain name of the business application, the central domain name system is configured to forward the domain name resolution request to a target egress gateway corresponding to the target domain name, and the central domain name system is preconfigured with gateway information of egress gateways corresponding to a plurality of domain names

S201

Receiving a first target network address and a gateway address of the target egress gateway that are fed back by the central domain name system, wherein the first target network address is obtained by the target egress gateway by sending the domain name resolution request to a corresponding first domain name resolution server for domain name resolution

S202

Performing network address translation on the first target network address to obtain a virtual network address

S203

Performing data transmission based on the virtual network address, the gateway address, and the first target network address

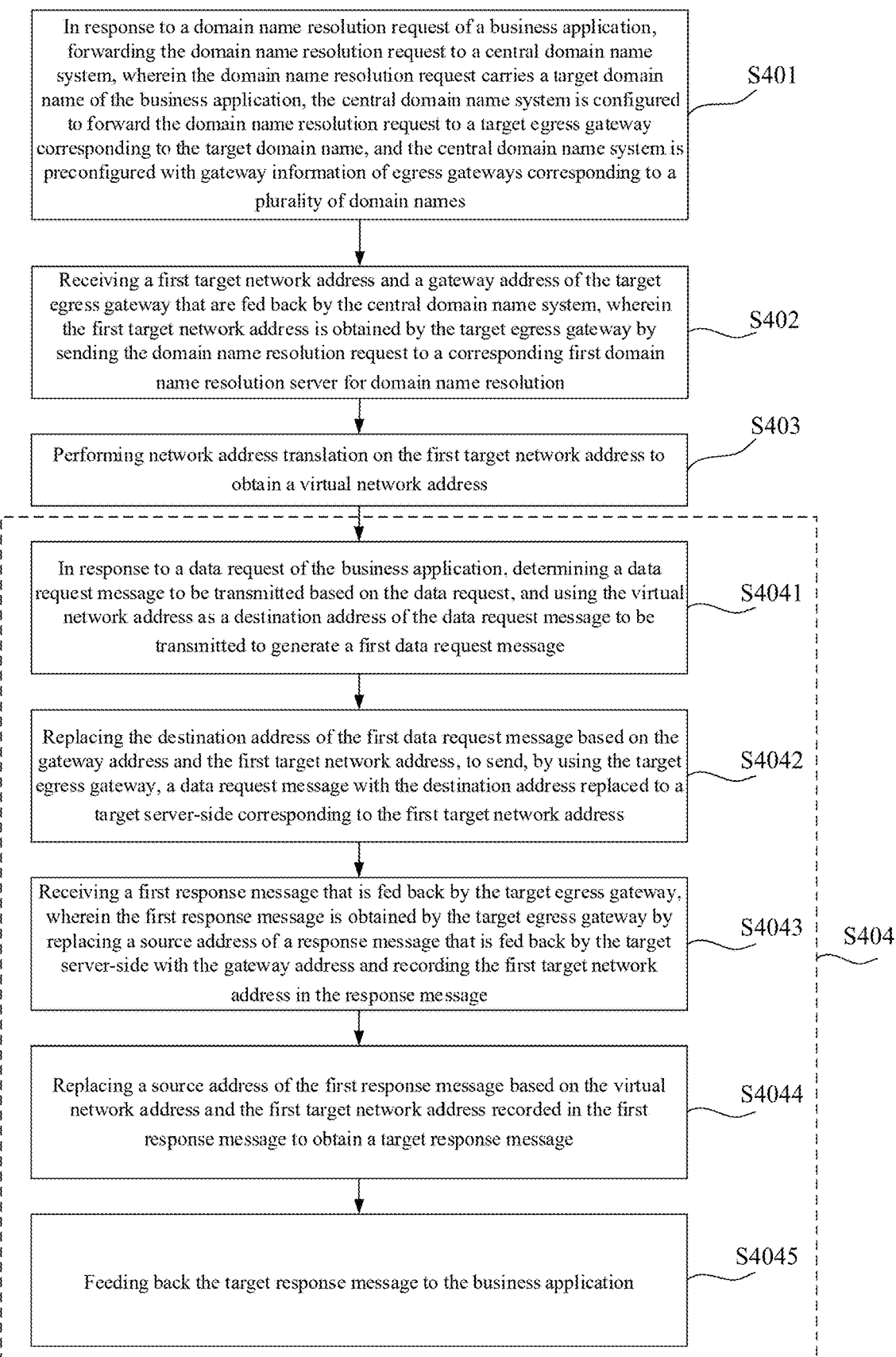

In response to a domain name resolution request of a business application, forwarding the domain name resolution request to a central domain name system, wherein the domain name resolution request carries a target domain name of the business application, the central domain name system is configured to forward the domain name resolution request to a target egress gateway corresponding to the target domain name, and the central domain name system is preconfigured with gateway information of egress gateways corresponding to a plurality of domain names

S401

Receiving a first target network address and a gateway address of the target egress gateway that are fed back by the central domain name system, wherein the first target network address is obtained by the target egress gateway by sending the domain name resolution request to a corresponding first domain name resolution server for domain name resolution

S402

Performing network address translation on the first target network address to obtain a virtual network address

S403

In response to a data request of the business application, determining a data request message to be transmitted based on the data request, and using the virtual network address as a destination address of the data request message to be transmitted to generate a first data request message

S4041

Replacing the destination address of the first data request message based on the gateway address and the first target network address, to send, by using the target egress gateway, a data request message with the destination address replaced to a target server-side corresponding to the first target network address

S4042

Receiving a first response message that is fed back by the target egress gateway, wherein the first response message is obtained by the target egress gateway by replacing a source address of a response message that is fed back by the target server-side with the gateway address and recording the first target network address in the response message

S4043          S404

Replacing a source address of the first response message based on the virtual network address and the first target network address recorded in the first response message to obtain a target response message

S4044

Feeding back the target response message to the business application

| Resolution request response module | 701 |
| Cross-region address reception module | 702 |
| Network address translation module | 703 |
| Cross-region data transmission module | 704 |

Processor — 801

Memory — 802

Input apparatus — 803

Output apparatus — 804

TRAFFIC SCHEDULING METHOD, APPARATUS, DEVICE, STORAGE MEDIUM, AND PROGRAM PRODUCT

CROSS-REFERENCE TO RELATED APPLICATION(S)

This application claims priority to Chinese Application No. 202410780693.4 filed in Jun. 17, 2024, the disclosures of which are incorporated herein by reference in their entities.

FIELD

The present disclosure relates to the field of network communication technologies, and in particular, to a traffic scheduling method, an apparatus, a device, a storage medium, and a program product.

BACKGROUND

As a virtual wide area network architecture, a software defined wide area network (SD-WAN) allows an enterprise or other organization to use any combination of transmission services to securely connect a user to an application. Among them, one of the core functions of SD-WAN is traffic scheduling. Through an intelligent routing algorithm and a traffic scheduling mechanism, SD-WAN can automatically select an optimal network path according to a real-time network traffic condition to ensure efficient transmission of network traffic and good performance of an application.

In a related art, for traffic scheduling in SD-WAN, a security management application usually needs to be installed on a terminal device inside an enterprise to use a client of the security management application to schedule traffic of a business application on the terminal device. When the client of the security management application detects that the business application on the terminal device tries to access a corresponding server-side resource, the client initiates a transport layer security (TLS) handshake to establish a secure connection. The client of the security management application parses a domain name of the business application from a server name indication (SNI) field of a TLS handshake packet, and determines an optimal traffic egress according to a predefined policy or algorithm. After the traffic egress is determined, the SD-WAN controller creates a session according to 5-tuple information. During the session, all network packets in the session are considered to be network packets of the parsed domain name, and the network packets are forwarded to the predetermined traffic egress.

SUMMARY

In view of this, the present disclosure provides a traffic scheduling method, an apparatus, a device, a storage medium, and a program product.

In a first aspect, the present disclosure provides a traffic scheduling method, applied to a software defined wide area network, and the method includes:

in response to a domain name resolution request of a business application, forwarding the domain name resolution request to a central domain name system, wherein the domain name resolution request carries a target domain name of the business application, the central domain name system is configured to forward the domain name resolution request to a target egress gateway corresponding to the target domain name, and the central domain name system is preconfigured with gateway information of egress gateways corresponding to a plurality of domain names:

receiving a first target network address and a gateway address of the target egress gateway that are fed back by the central domain name system, wherein the first target network address is obtained by the target egress gateway by sending the domain name resolution request to a corresponding first domain name resolution server for domain name resolution:

performing network address translation on the first target network address to obtain a virtual network address; and performing data transmission based on the virtual network address, the gateway address, and the first target network address.

In a second aspect, the present disclosure provides a traffic scheduling apparatus, applied to a software defined wide area network, and the apparatus includes:

a resolution request response module, configured to in response to a domain name resolution request of a business application, forward the domain name resolution request to a central domain name system, wherein the domain name resolution request carries a target domain name of the business application, the central domain name system is configured to forward the domain name resolution request to a target egress gateway corresponding to the target domain name, and the central domain name system is preconfigured with gateway information of egress gateways corresponding to a plurality of domain names:

a cross-region address reception module, configured to receive a first target network address and a gateway address of the target egress gateway that are fed back by the central domain name system, wherein the first target network address is obtained by the target egress gateway by sending the domain name resolution request to a corresponding first domain name resolution server for domain name resolution:

a network address translation module, configured to perform network address translation on the first target network address to obtain a virtual network address; and a cross-region data transmission module, configured to perform data transmission based on the virtual network address, the gateway address, and the first target network address.

In a third aspect, the present disclosure provides a computer device, including a memory and a processor, wherein the memory and the processor communicate with each other, the memory stores computer instructions, and the processor executes the computer instructions to perform the traffic scheduling method according to the above first aspect or any corresponding implementation of the first aspect.

In a fourth aspect, the present disclosure provides a computer-readable storage medium, wherein the computer-readable storage medium stores computer instructions, and the computer instructions are configured to enable a computer to perform the traffic scheduling method according to the above first aspect or any corresponding implementation of the first aspect.

In a fifth aspect, the present disclosure provides a computer program product, including computer instructions, wherein the computer instructions are configured to enable a computer to perform the traffic scheduling method according to the above first aspect or any corresponding implementation of the first aspect.

BRIEF DESCRIPTION OF THE DRAWINGS

In order to illustrate the technical solutions in the embodiments of the present disclosure more clearly, the drawings required for describing the embodiments or the prior art will be briefly described in the following. Apparently; the drawings in the following description show some embodiments of the present disclosure, and other drawings may also be obtained by those of ordinary skill in the art according to these drawings without paying creative effort.

FIG. 2 is a schematic flowchart of a first traffic scheduling method according to an embodiment of the present disclosure:

FIG. 4 is a schematic flowchart of a second traffic scheduling method according to an embodiment of the present disclosure:

DETAILED DESCRIPTION OF EMBODIMENTS

Figure 1:
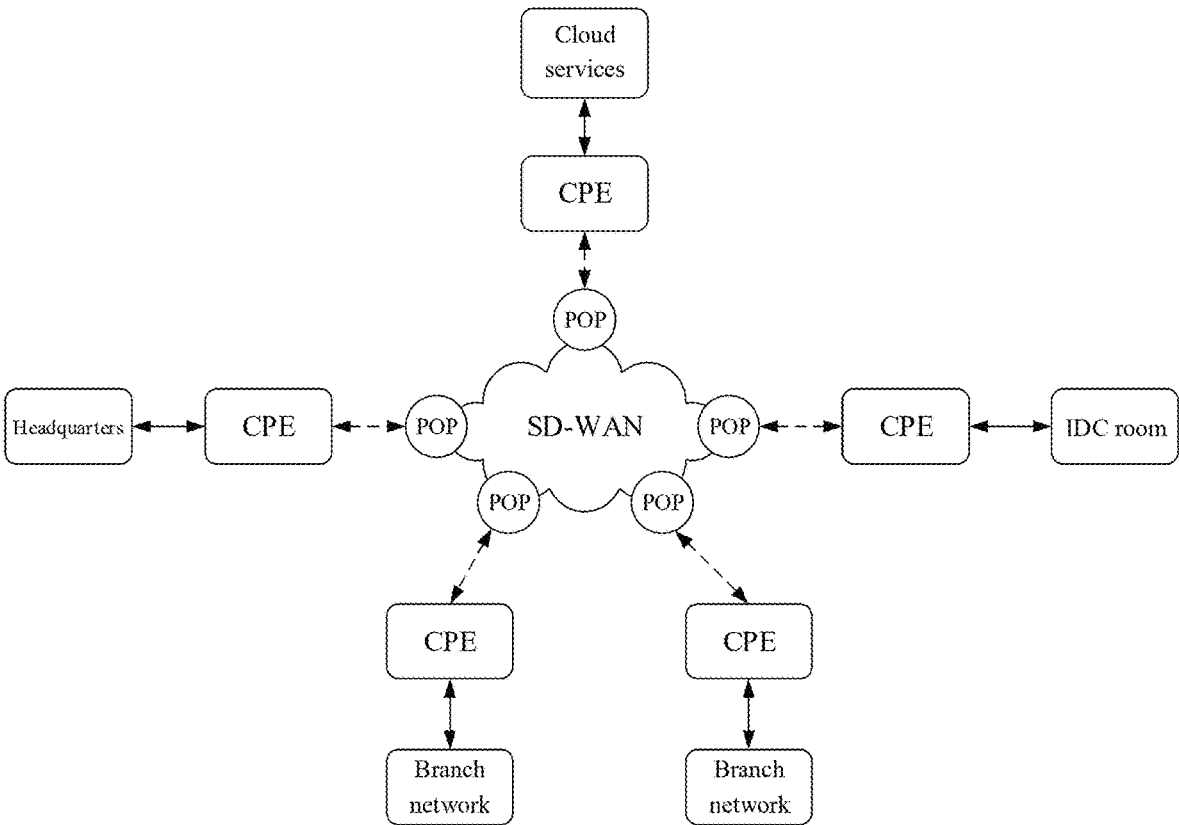
FIG. 1 is a schematic diagram of a network architecture based on SD-WAN according to an embodiment of the present disclosure.

The embodiments of the present disclosure will be described in more detail below with reference to the drawings. Although some embodiments of the present disclosure are shown in the drawings, it should be understood that the present disclosure can be implemented in various forms, and should not be construed as being limited to the embodiments set forth herein. On the contrary; these embodiments are provided for a more thorough and complete understanding of the present disclosure. It should be understood that the drawings and embodiments of the present disclosure are only for illustrative purposes, and are not intended to limit the protection scope of the present disclosure.

In the description of the embodiments of the present disclosure, the term "include/comprise" and similar terms should be understood as open inclusion, that is, "include/comprise but not limited to". The term "based on" should be understood as "at least partially based on". The term "one embodiment" or "this embodiment" should be understood as "at least one embodiment". The term "some embodiments" should be understood as "at least some embodiments". Other explicit and implicit definitions may also be included below.

In this document, unless expressly stated, performing a step "in response to A" does not mean that the step is performed immediately after "A", but may include one or more intermediate steps.

It may be understood that data involved in the technical solution of the present disclosure (including but not limited to the data itself, acquisition, use, storage or deletion of the data) should comply with requirements of corresponding laws, regulations and related provisions.

It may be understood that before using the technical solution disclosed in the embodiments of the present disclosure, relevant users should be informed of the type, use scope, use scenario, etc. of information involved in the present disclosure in an appropriate manner according to relevant laws and regulations, and authorization of relevant users should be obtained. Relevant users may include any type of right subject, such as individuals, enterprises or groups.

For example, in response to receiving an active request from a user, prompt information is sent to the relevant user to explicitly prompt the relevant user that an operation requested to be performed will need to obtain and use information of the relevant user, so that the relevant user can independently select whether to provide information to software or hardware such as an electronic device, an application, a server or a storage medium that performs the operation of the technical solution of the present disclosure according to the prompt information.

As an optional but non-restrictive implementation, a manner of sending the prompt information to the relevant user in response to receiving the active request from the relevant user may be, for example, a pop-up window, and the prompt information may be presented in the form of text in the pop-up window. In addition, the pop-up window may also carry a selection control for the user to select "agree" or "disagree" to provide information to the electronic device.

It may be understood that the above process of notifying and obtaining user authorization is only schematic, and does not constitute a limitation to implementations of the present disclosure. Other implementations that satisfy relevant laws and regulations may also be applied to the implementations of the present disclosure.

Office security usually involves security management of a network, an identity and a terminal. By implementing private network networking, access control, management of the terminal in the private network, and information security protection, digital office can be made safer, more efficient and easier to use. Security management at the network layer can ensure that private networks such as office networks can run safely and efficiently, thereby ensuring secure transmission and storage of service data. Security management at the identity layer can improve the efficiency and security of identity authentication for users to access the private network. Security management at the terminal layer can realize unified management of terminal devices in the private network, data leakage prevention and terminal threat protection, thereby ensuring the security of enterprise data.

In practical applications, security management of the network, the identity and the terminal can realize technical association in multiple technical branches such as networking strategy, network admission and control, remote access, unified terminal management, terminal detection and response, enterprise data leakage prevention and identity authentication management, thereby making digital office simpler, more efficient and easier to implement.

At present, a traditional wide area network (WAN) architecture does not take cloud computing into account. Therefore, when using the traditional wide area network architecture, a large organization needs to backhaul traffic from various branch networks in an enterprise internal network to a central location or a headquarters data center that applies advanced security inspection services for advanced security inspection and services. However, a delay caused by backhauling may affect the performance of applications. Especially with the development of cloud computing technology, problems brought by the traditional wide area network architecture become more and more obvious.

In contrast, as a virtual wide area network architecture, a software defined wide area network (SD-WAN) allows a large organization to use any combination of transmission services to securely connect a user to an application, and the network architecture of SD-WAN is more flexible. SD-WAN supports hosting applications in an Internet data center, a public cloud or a private cloud, and software as a service (SaaS) inside an enterprise, and can provide a higher level of application performance.

One of the core functions of SD-WAN is traffic scheduling. SD-WAN can automatically select an optimal network path of an application service according to a real-time network traffic condition through an intelligent routing algorithm and a traffic scheduling mechanism, and optimize utilization of bandwidth. When configuring a device of SD-WAN, it is necessary to set an intelligent routing rule and a traffic scheduling priority to ensure efficient transmission of network traffic and good performance of an application.

In a related art, traffic scheduling in SD-WAN may be divided into two scheduling schemes according to a resource type: an Internet Protocol (IP)-based scheduling scheme and a domain name-based scheduling scheme. Among them, the IP-based scheduling scheme mostly requires a user to explicitly configure all IP addresses under a business application, so as to schedule network packets to different traffic egresses (that is, branch gateways connected to a server-side of the business application) according to a destination IP address of the network packets. However, this IP-based scheduling scheme has the following disadvantages. Firstly, a flow table and a routing configuration need to be adjusted according to user configuration in a traffic scheduling process, which increases the configuration cost of the SD-WAN controller. Secondly, for a SaaS application, a content delivery network (CDN) is usually used to dynamically allocate IP addresses in the traffic scheduling process, which makes it difficult to obtain all IP addresses of a third-party SaaS application. Thirdly: application of technologies such as CDN makes an application IP address of a business application may change at any time, which results in reconfiguration of the flow table and increased complexity of traffic scheduling. Therefore, for users of SaaS applications, a domain name-based scheduling scheme is mainly adopted at present.

The domain name-based scheduling scheme requires configuration of a domain name of a business application, and an SD-WAN controller performs intelligent routing according to a domain name to which a network packet belongs. Specifically: a network administrator needs to configure a domain name of a business application that needs intelligent routing in the SD-WAN controller, and a security management application installed on each terminal device inside an enterprise schedules access traffic of the business application based on the configured domain name of the business application. When a client of the security management application detects that the business application on the terminal device tries to access a corresponding server-side resource, the client of the security management application initiates a transport layer security (TLS) handshake to establish a secure connection. The client of the security management application parses a domain name of the business application from a server name indication (SNI) field of a TLS handshake packet, and determines a traffic egress for accessing a server-side corresponding to the domain name according to a predefined policy or algorithm. After the traffic egress is determined, the SD-WAN controller creates a session according to 5-tuple information. During the session, all network packets in the session are considered to be network packets of the parsed domain name, and the network packets are forwarded to the predetermined traffic egress.

However, this domain name-based scheduling scheme has the following disadvantages. Firstly, domain name resolution needs to be performed on the client of the security management application. If the application domain name to be resolved enables CDN, the client of the security management application requests a server of the nearest domain name system (DNS) for resolution of the domain name to resolve a service closest to a geographic location of the client, resulting in traffic requiring a jump to reach the traffic egress, causing a long access delay. For example, a server-side of a business application to be accessed is in region B, and a traffic egress corresponding to the server-side is also in region B. If the client of the security management application is in region A, the resolved service is in region A. Therefore, traffic for the domain name will be scheduled to region A first, and then jump from region A to region B. Secondly, because multiple IP addresses may be resolved for the same domain name, if the IP address changes, the SD-WAN controller needs to update connection session information based on 5-tuple in the flow table to ensure that the traffic is correctly routed to a new target IP address, which results in frequent changes of the flow table by the SD-WAN controller, and a large amount of connection session information based on 5-tuple needs to be maintained, such as a source IP address, a destination IP address, a source port, a destination port and a transport layer protocol. Thirdly, because the 5-tuple does not include application layer information, such as user identity: device type, application type, etc., traffic cannot be distinguished based on 5-tuple to achieve finer-grained traffic scheduling, for example, traffic of different users cannot be scheduled to different egresses.

In short, this domain name-based traffic scheduling scheme requires domain name resolution on the client of the security management application to resolve a service closest to a geographic location of the client, rather than a service closest to the traffic egress, resulting in traffic of the domain name requiring a series of jumps to reach the service closest to the traffic egress, causing a long access delay.

In view of this, the present disclosure provides a traffic scheduling method, an apparatus, a device, a storage medium, and a program product to solve a problem of a long access delay in a traffic scheduling process of an SD-WAN network.

In the traffic scheduling method provided by the embodiment of the present disclosure, a domain name resolution request of a business application is forwarded to a central domain name system, and the central domain name system forwards the domain name resolution request to a target egress gateway corresponding to a target domain name of the business application. The domain name resolution request is sent to a first domain name resolution server corresponding to the target egress gateway by using the target egress gateway for domain name resolution. Therefore, it is possible to resolve a first target network address close to the target egress gateway, thereby effectively reducing an access delay of an SD-WAN network in a traffic scheduling process. In addition, the first target network address is translated into a virtual network address, and data transmission is performed based on the virtual network address, a gateway address, and the first target network address. Therefore, only a configuration relationship between a domain name and an egress gateway needs to be maintained, so that when a network address resolved based on the target domain name changes, the resolved network address can still be used to access the target egress gateway, thereby avoiding frequent changes of a flow table by an SD-WAN controller.

In view of this, an embodiment of a traffic scheduling method is provided according to the embodiments of the present disclosure. It should be noted that the steps shown in the flowcharts in the drawings may be executed in a computer system such as a set of computer-executable instructions, and although a logical order is shown in the flowcharts, in some cases, the steps shown or described may be executed in a different order from the order here.

The network architecture based on a software defined wide area network (SD-WAN) adopted in the embodiment of the present disclosure mainly includes: a client of a security management application for enterprise internal members, customer premises equipment (CPE) of SD-WAN, a point of presence (POP), a central domain name system, and a control plane. Referring to FIG. 1, the functions of each component in the network architecture of the present disclosure are as follows:

(1) The client of the security management application is deployed on each terminal device inside an enterprise, and the client is configured to manage a business application on the terminal device and schedule traffic for the managed business application to access a corresponding server-side to obtain a corresponding application resource, such as application resources such as a business application hosted in an Internet data center, a public cloud, a private cloud, and a SaaS application.

(2) The CPE is deployed at a headquarters of the enterprise, a branch network, an Internet data center (IDC room), cloud services (such as a public cloud and a private cloud), or the like. The CPE, as a branch gateway, is connected to the client of the branch network where it is located, and is configured to aggregate all proxy traffic (such as traffic of the client) of the branch network where it is located.

(3) The POP is connected to a physically adjacent CPE, and the POP is configured to forward traffic aggregated by the CPE.

(4) The control plane is configured to configure application information such as a name of the business application and a domain name thereof. In addition, the control plane is also configured to configure a routing policy corresponding to each business application, for example, CPE information corresponding to each business application as an egress gateway: wherein the egress gateway is close to the server-side of the business application in terms of geographical location. The control plane delivers the configured content to components such as the CPE, the POP, the central domain name system, and the client of the security management application, and uniformly manages all the CPE, the POP, the central domain name system, and the client of the security management application.

(5) The central domain name system is connected to the client of the security management application and the CPE, and the central domain name system is configured to forward a domain name resolution request, which carries a domain name of a certain business application and is forwarded by the client, to a corresponding CPE as an egress gateway to resolve a network address of the server-side corresponding to the domain name.

In this embodiment, a traffic scheduling method is provided, which can be applied to the above SD-WAN, such as the client of the security management application, or can be applied to the CPE in a region where the client of the security management application is located. FIG. 2 is a schematic flowchart of a first traffic scheduling method according to an embodiment of the present disclosure. As shown in FIG. 2, the process includes the following steps.

Step S201, in response to a domain name resolution request of a business application, forwarding the domain name resolution request to a central domain name system, wherein the domain name resolution request carries a target domain name of the business application, the central domain name system is configured to forward the domain name resolution request to a target egress gateway corresponding to the target domain name, and the central domain name system is preconfigured with gateway information of egress gateways corresponding to a plurality of domain names.

It should be noted that the target egress gateway is a CPE in a region where the server-side corresponding to the target domain name is located, or other CPEs that are closer to the server-side corresponding to the target domain name in terms of geographical location.

Specifically, a related person may pre-configure domain names of different business applications and gateway information of egress gateways corresponding to the domain names on the control plane of the SD-WAN, and deliver the configured content to the client of the security management application and the central domain name system. When the central domain name system receives the domain name resolution request from the client of the security management application, it determines the target egress gateway corresponding to the target domain name based on the content delivered by the control plane, wherein the target egress gateway is close to the server-side corresponding to the target domain name in terms of geographical location. For example, if the server-side corresponding to the target domain name is located in region A, the target egress gateway is a CPE deployed in region A.

Step S202, receiving a first target network address and a gateway address of the target egress gateway that are fed back by the central domain name system, wherein the first target network address is obtained by the target egress gateway by sending the domain name resolution request to a corresponding first domain name resolution server for domain name resolution.

Specifically, taking the domain name resolution request forwarded by the client of the security management application as an example, after the central domain name system forwards the domain name resolution request to the target egress gateway, the target egress gateway forwards the domain name resolution request to a first domain name resolution server closer to the target egress gateway or in the same region, and the first domain name resolution server parses the target domain name in the domain name resolution request to obtain the first target network address. The first domain name resolution server feeds back the first target network address to the target egress gateway, and then the target egress gateway feeds back the first target network address to the central domain name system. At the same time, the central domain name system obtains the gateway address of the target egress gateway; and the central domain name system feeds back the first target network address and the gateway address to the client.

Step S203, performing network address translation on the first target network address to obtain a virtual network address.

It is worth noting that because multiple network addresses (the resolved network address is an IP address) may be resolved for a domain name, when the client of the security management application schedules traffic of the same domain name, it is likely that the network address resolved based on the domain name will change, and the client needs to dynamically adjust the routing when scheduling traffic of the same domain name, which may easily cause an access error. Based on this, in this embodiment, network address translation (Network Address Translation. NAT) is adopted to perform network address translation on the first target network address to obtain the virtual network address, so that one virtual network address can be used to represent all the resolved network addresses under the same domain name, so as to facilitate the client to schedule traffic of the domain name using the same virtual network address. In addition, for some application resources that need to be protected, translating the network address actually resolved from the domain name into the virtual network address can also avoid the external network from directly obtaining the actual network address of the domain name to a certain extent, thereby ensuring data security.

Specifically, a plurality of preset network addresses may be predefined to construct an address pool of NAT. An unused preset network address is selected from the address pool based on the first target network address to be used as the virtual network address of the first target network address.

For example, a network address in a network segment is used as the preset network address, and then a network address is sequentially selected from the network segment as the virtual network address of the first target network address according to the request time sequence of the domain name resolution request.

Step S204, performing data transmission based on the virtual network address, the gateway address, and the first target network address.

Specifically, after obtaining the virtual network address, the gateway address, and the first target network address, if the client of the security management application receives a data request of the business application, it determines a data request message to be transmitted based on the data request of the business application, and uses the virtual network address as a destination address of the data request message to be transmitted to generate a first data request message. At this time, it is necessary to use destination network address translation (DNAT) to replace the destination address of the first data request message with the gateway address, so as to send the first data request message to the target egress gateway. At the same time, before sending the first data request message to the target egress gateway, it is necessary to record the resolved first target network address in an option field (that is, an Options field of the message) of the first data request message, so that the target egress gateway can know the destination address of the next hop of the first data request message, so as to forward the first data request message to the target server-side corresponding to the first target network address, and the target server-side provides the service.

Furthermore, the target server-side generates a response message based on the received data request message, and feeds back the response message to the target egress gateway. The target egress gateway replaces a source address in the response message with the gateway address, and feeds back the response message to the client of the security management application. At the same time, before feeding back the response message to the client, it is necessary to record the first target network address in an option field of the response message, so that the client replaces the source address of the response message with the first target network address, and then further replaces the source address of the response message with the virtual network address corresponding to the first target network address to obtain a target response message, wherein the target response message includes related resource data of the business application/target domain name.

In the traffic scheduling method provided in this embodiment, a domain name resolution request of a business application is forwarded to a central domain name system, and the central domain name system forwards the domain name resolution request to a target egress gateway corresponding to a target domain name of the business application. The domain name resolution request is sent to a first domain name resolution server corresponding to the target egress gateway by using the target egress gateway for domain name resolution.

Therefore, it is possible to resolve a first target network address close to the target egress gateway, thereby effectively reducing an access delay of an SD-WAN network in a traffic scheduling process. In addition, the first target network address is translated into a virtual network address, and data transmission is performed based on the virtual network address, a gateway address, and the first target network address. Therefore, only a configuration relationship between a domain name and an egress gateway needs to be maintained, so that when a network address resolved based on the target domain name changes, the resolved network address can still be used to access the target egress gateway, thereby avoiding frequent changes of a flow table by an SD-WAN controller.

Exemplarily, assuming that the target domain name is A.com, the target network address resolved from A.com is IP1 at the beginning. If the original SD-WAN control process is followed, flow table information with the destination address of IP1 needs to be recorded in the flow table of the SD-WAN controller. If the target network address resolved from A.com changes to IP11, flow table information with the destination address of IP11 needs to be recorded in the flow table of the SD-WAN controller. However, if the traffic scheduling method of the present disclosure is adopted, regardless of whether the target network address resolved from A.com is IP1 or IP11, the destination address of the traffic will be changed to the gateway address of the target egress gateway, and the traffic of A.com will still be scheduled to the target egress gateway. Therefore, frequent changes of the flow table by the SD-WAN controller can be avoided to a certain extent.

In some optional implementations, forwarding the domain name resolution request to the central domain name system in the above step S201 includes:

Step a1, acquiring a scheduling condition of the target domain name; and

Step a2, in response to the target domain name being a domain name to be scheduled, sending the domain name resolution request to the central domain name system.

It should be noted that the scheduling condition of the target domain name is used to indicate whether the target domain name needs to be scheduled. Whether the client of the security management application needs to schedule traffic corresponding to the target domain name across regions to the egress gateway or the server-side corresponding to the target domain name may be determined according to the preconfigured correspondence between the domain name and the egress gateway: so as to obtain the scheduling condition of the target domain name. Exemplarily, assuming that the server-side corresponding to the target domain name and the client of the security management application are in the same region, the target domain name may be regarded as a domain name that does not need to be scheduled. Assuming that the server-side corresponding to the target domain name and the client of the security management application are in different regions, the target domain name may be regarded as a domain name that needs to be scheduled. In addition, a plurality of domain names to be scheduled may also be preconfigured, and the scheduling condition of the target domain name is obtained based on a matching result of the target domain name and the plurality of domain names to be scheduled.

In the traffic scheduling method provided in this embodiment, the domain name resolution request is forwarded to the central domain name system only when the target domain name is the domain name to be scheduled, so that the central domain name system is used to forward the domain name resolution request to the target egress gateway, and the domain name resolution request is resolved by the first domain name resolution server corresponding to the target egress gateway. Therefore, it is possible to avoid transmitting a domain name that does not need to be scheduled to the first domain name resolution server corresponding to the target egress gateway for domain name resolution, so as to improve the efficiency of domain name resolution, thereby further reducing the access delay in the traffic scheduling process.

In some optional implementations, acquiring the scheduling condition of the target domain name in the above step a1 includes:

Step a11, acquiring a plurality of domain names to be scheduled; and

Step a12, obtaining the scheduling condition of the target domain name based on a matching result of the target domain name and the plurality of domain names to be scheduled.

Specifically, the plurality of domain names to be scheduled in step a11 are the domain names of the business applications configured by the SD-WAN control plane. If the target domain name matches any domain name to be scheduled, it is determined that the scheduling condition of the target domain name is that the target domain name is the domain name to be scheduled. If the target domain name does not match all domain names to be scheduled, it is determined that the scheduling condition of the target domain name is that the target domain name is not the domain name to be scheduled.

Further, the plurality of domain names to be scheduled are encapsulated into a Bloom filter, and the Bloom filter is used to indicate the existence of the plurality of domain names to be scheduled. Then, the above step a12 includes: performing a Bloom calculation on the target domain name and the Bloom filter to obtain a matching result of the target domain name and the plurality of domain names to be scheduled; and determining the scheduling condition of the target domain name based on the matching result.

Specifically, for each domain name to be scheduled, a hash function provided by the Bloom filter may be used to map the domain name to be scheduled to different positions of a preset bit array in the Bloom filter, and set values at these positions to 1. When it is necessary to query the matching condition of the target domain name and the plurality of domain names to be scheduled, the hash function provided by the Bloom filter may be used to perform hash mapping (that is, the above-mentioned Bloom calculation) on the target domain name to map the target domain name to a corresponding position of the preset bit array, and check whether the values at these positions are all 1. If the values at all mapped positions are 1, it indicates that the target domain name exists in the plurality of domain names to be scheduled. If the value at any position is 0, it indicates that the target domain name does not exist in the plurality of domain names to be scheduled. Therefore, the efficiency of domain name matching can be effectively improved when the amount of data of domain names to be scheduled is large.

If the target domain name does not exist in the plurality of domain names to be scheduled, it is determined that the scheduling condition of the target domain name is that the target domain name is not the domain name to be scheduled. If the target domain name exists in the plurality of domain names to be scheduled, it is determined that the scheduling condition of the target domain name is that the target domain name is the domain name to be scheduled.

In some optional implementations, performing the network address translation on the first target network address to obtain the virtual network address in the above step S203 includes: determining an unused preset network address from a plurality of preset network addresses; and determining the virtual network address based on a network planning sequence of the unused preset network address.

Specifically, according to the request time sequence of the domain name resolution request and the network planning sequence of the preset network address, a preset network address with the highest network planning sequence may be selected from the unused preset network addresses to be used as the virtual network address. Therefore, it is possible to avoid different domain names from using the same virtual network address, thereby ensuring the reliability of network transmission.

In some optional implementations, the traffic scheduling method of the present disclosure further includes:

Step b1, in response to the target domain name not being the domain name to be scheduled, sending the domain name resolution request to a second domain name resolution server corresponding to a client of a security management application in the software defined wide area network.

Step b2, receiving a second target network address that is fed back by the second domain name resolution server, wherein the second target network address is obtained by the second domain name resolution server by performing domain name resolution on the domain name resolution request; and Step b3, performing data transmission based on the second target network address.

Specifically, in response to the target domain name not being the domain name to be scheduled, the domain name resolution request is sent to the second domain name resolution server corresponding to the client of the security management application, and the second domain name resolution server performs domain name resolution on the target domain name in the domain name resolution request to obtain the second target network address. The second domain name resolution server feeds back the resolved second target network address to the client.

Furthermore, if the client of the security management application receives a data request of the business application, it generates a data request message based on the second target network address, and sends the data request message to the server-side corresponding to the second target network address. The server-side corresponding to the second target network address generates a response message based on the received data request message, and feeds back the response message to the client of the security management application.

It should be noted that the client of the security management application in the above step b1 and the business application are on the same terminal device. The second domain name resolution server refers to a domain name system server that is closest to the client of the security management application or in the same region. The second target network address resolved by the second domain name resolution server is a network address of the server-side of the business application that is closest to the client of the security management application, or a network address of the server-side of the business application that is in the same region as the client of the security management application.

In the traffic scheduling method provided in this embodiment, when the target domain name is not the domain name to be scheduled, the domain name resolution request is directly forwarded to the second domain name resolution server corresponding to the client of the security management application, and the second domain name resolution server performs domain name resolution on the target domain name in the domain name resolution request to obtain the second target network address for traffic scheduling. Therefore, when there is no need to schedule traffic of the target domain name, it is possible to resolve the target network address of the server-side of the business application that is closer to the client, so as to further improve the efficiency of domain name resolution and reduce the access delay in the traffic scheduling process.

Figure 3:
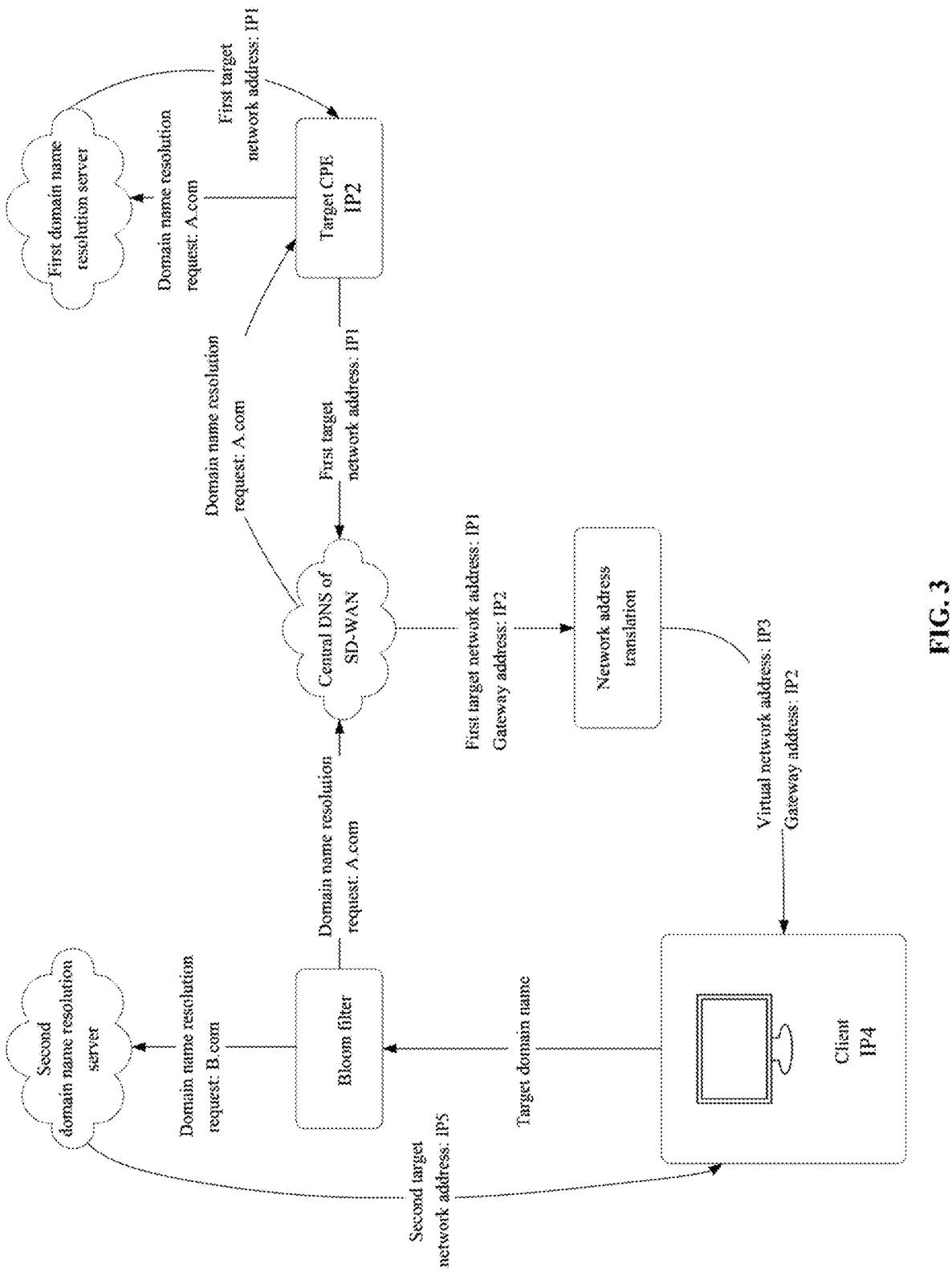
FIG. 3 is a schematic flowchart of a domain name resolution process according to an embodiment of the present disclosure.

Exemplarily, as shown in FIG. 3, taking the central domain name system as the central DNS of SD-WAN and the target egress gateway as the target CPE in the region where the target server-side corresponding to the target domain name is located as an example, if the business application A on the terminal device where the client of the security management application is located wants to access the corresponding server-side to obtain the application resource, the client of the security management application acquires the target domain name of the business application A, for example, A.com. If the server-side corresponding to the business application A and the client of the security management application are not in the same region, the client uses a Bloom filter to determine that traffic corresponding to A.com needs to be scheduled, the client forwards A.com to the central DNS, and the central DNS sends A.com to the target CPE corresponding to the target server-side, and the target CPE sends A.com to the first domain name resolution server for domain name resolution. Assuming that the first target network address corresponding to A.com resolved is IP1 (that is, the network address of the server-side corresponding to A.com is IP1), the first domain name resolution server feeds back IP1 to the target CPE, and the target CPE feeds back IP1 to the central DNS. The central DNS acquires the gateway address of the target CPE, such as IP2, and the central DNS feeds back IP1 and IP2 to the client of the security management application. The client performs network address translation on IP1 to obtain the virtual network address, such as IP3. Then, the client can schedule the traffic of A.com to the corresponding server-side according to IP1. IP2. IP3, and the network address of the client (such as IP4).

In addition, if the business application B on the terminal device where the client of the security management application is located wants to access the corresponding server-side to obtain the application resource, the client of the security management application acquires the target domain name of the business application B, for example, B.com. If the server-side corresponding to the business application B and the client of the security management application are in the same region, and the client does not need to schedule the traffic of the business application B across regions, the client of the security management application uses a Bloom filter to determine that traffic corresponding to B.com does not need to be scheduled, and the client forwards B.com to a second domain name resolution server that is closest to the client in terms of geographical location or in the same region for domain name resolution to obtain a second target network address, such as IP5 (that is, the network address of the server-side corresponding to B.com is IP5). The second domain name resolution server feeds back IP5 to the client of the security management application, and the client schedules the traffic of B.com to the corresponding server-side based on IP5.

In this embodiment, a second traffic scheduling method is provided, which may be applied to the above SD-WAN, for example, a client of SD-WAN, or applied to a CPE in a region where the client is located. FIG. 4 is a flowchart of a second traffic scheduling method according to an embodiment of the present disclosure. As shown in FIG. 4, the process includes the following steps.

Step S401, in response to a domain name resolution request of a business application, forwarding the domain name resolution request to a central domain name system, wherein the domain name resolution request carries a target domain name of the business application, the central domain name system is configured to forward the domain name resolution request to a target egress gateway corresponding to the target domain name, and the central domain name system is preconfigured with gateway information of egress gateways corresponding to a plurality of domain names. Reference may be made to the above step S201, which will not be repeated here.

Step S402, receiving a first target network address and a gateway address of the target egress gateway that are fed back by the central domain name system, wherein the first target network address is obtained by the target egress gateway by sending the domain name resolution request to a corresponding first domain name resolution server for domain name resolution. Reference may be made to the above step S202, which will not be repeated here.

Step S403, performing network address translation on the first target network address to obtain a virtual network address. Reference may be made to the above step S203, which will not be repeated here.

Step S404, performing data transmission based on the virtual network address, the gateway address, and the first target network address.

Specifically, performing the data transmission based on the virtual network address, the gateway address, and the first target network address in the above step S404 includes:

Step S4041, in response to a data request of the business application, determining a data request message to be transmitted based on the data request, and using the virtual network address as a destination address of the data request message to be transmitted to generate a first data request message.

Specifically, after obtaining the first target network address, the virtual network address, and the gateway address, if the client of the security management application receives the data request of the business application, it generates the first data request message based on the data request of the business application and the virtual network address to schedule data request traffic of the business application to the target server-side corresponding to the first target network address. A source address of the first data request message is the network address of the client, and a destination address of the first data request message is the virtual network address.

Step S4042, replacing the destination address of the first data request message based on the gateway address and the first target network address, to send, by using the target egress gateway, a data request message with the destination address replaced to a target server-side corresponding to the first target network address. Specifically, destination network address translation (DNAT) may be performed on the destination address of the first data request message based on the gateway address, and the first target network address is added to the option field of the first data request message, and then the data request message with the replaced destination address is sent to the target egress gateway. When receiving the data request message with the replaced destination address, the target egress gateway forwards the data request message to the target server-side corresponding to the first target network address based on the first target network address recorded in the data request message.

Step S4043, receiving a first response message that is fed back by the target egress gateway, wherein the first response message is obtained by the target egress gateway by replacing a source address of a response message that is fed back by the target server-side with the gateway address and recording the first target network address in the response message.

Specifically, when receiving the data request message with the replaced destination address that is sent by the target egress gateway, the target server-side generates a corresponding response message and feeds back the response message to the target egress gateway. After receiving the response message that is fed back by the target server-side, the target egress gateway replaces the source address in the response message from the first target network address with the gateway address, and records the first target network address in the response message to obtain the first response message, so that a next hop node can return the first response message to the client.

Specifically, the first target network address is recorded in an option field of a header of the response message.

Step S4044, replacing a source address of the first response message based on the virtual network address and the first target network address recorded in the first response message to obtain a target response message.

Specifically, in order to enable the client of the security management application to determine which data request message of the client the currently received first response message is fed back for, to ensure that the correct application resource is resolved. Therefore, corresponding to the process of sending the data request message to the target server-side, after receiving the first response message fed back by the target egress gateway, the client of the security management application needs to first replace the source address of the first response message with the first target network address based on the first target network address recorded in the first response message, and then further replace the source address of the response message after the source address replacement from the first target network address with the virtual network address according to the correspondence between the first target network address and the virtual network address determined in the domain name resolution process, to obtain the target response message.

In other words, because the client of the security management application generates the first data request message with the virtual network address as the destination address, when receiving the first response message fed back by the target egress gateway, the client of the security management application may mistakenly think that the feedback data in the first response message is generated by the target egress gateway instead of being fed back by the target server-side because the source address of the first response message is the gateway address of the target egress gateway, if the client of the security management application does not replace the source address of the first response message according to the first target network address recorded in the first response message, thereby causing data parsing errors. Moreover, because the client of the security management application generates the first data request message with the virtual network address as the destination address, after replacing the source address of the first response message from the gateway address to the first target network address according to the first target network address recorded in the first response message, the client also needs to further replace the source address of the response message after the source address replacement from the first target network address to the virtual network address, so that the data transmission process of the present disclosure conforms to the access process of the standard hypertext transfer protocol (HTTP).

Step S4045, feeding back the target response message to the business application.

In the traffic scheduling method provided in this embodiment, after the first data request message is generated with the virtual network address as the destination address, the destination address of the first data request message is replaced based on the gateway address and the first target network address. Therefore, the SD-WAN controller only needs to maintain the configuration relationship between the domain name and the egress gateway, so that when the target network address resolved based on the target domain name changes, the destination address of the data request message is directed to the corresponding target egress gateway, thereby reducing the frequency of changing the flow table by the SD-WAN controller and avoiding the SD-WAN controller from maintaining a large amount of 5-tuple information. At the same time, the target egress gateway replaces the source address of the response message fed back by the target server-side with the gateway address, and records the first target network address in the response message to obtain the first response message.

Therefore, when the first response message fed back by the target egress gateway is received, the source address of the first response message can be replaced based on the virtual network address and the first target network address recorded in the first response message. Therefore, it is possible to ensure that the response message fed back by the target server-side is correctly obtained, so as to improve the accuracy of data transmission.

In some optional implementations, replacing the destination address of the first data request message based on the gateway address and the first target network address to send, by using the target egress gateway, the data request message with the destination address replaced to the target server-side corresponding to the first target network address in the above step S4042 includes:

Step c1, replacing the destination address of the first data request message with the gateway address, and recording the first target network address in the first data request message to obtain a second data request message.

Step c2, sending the second data request message to the target egress gateway based on the destination address of the second data request message, wherein the target egress gateway is configured to replace the destination address of the second data request message with the first target network address based on the first target network address recorded in the second data request message to send the second data request message to the target server-side.

It should be noted that the first target network address is recorded in the option field of the first data request message.

In the traffic scheduling method provided in this embodiment, when scheduling the data request traffic of the business application to the corresponding server-side, the destination address of the first data request message is replaced from the virtual network address corresponding to the target domain name with the gateway address to obtain the second data request message, and the second data request message is forwarded to the target server-side by the target egress gateway. Therefore, when SD-WAN is used for traffic scheduling, data request traffic under the same domain name can be output through the corresponding target egress gateway, so as to avoid frequent changes of the flow table by the SD-WAN controller.

In some optional implementations, sending the second data request message to the target egress gateway based on the destination address of the second data request message in the above step c2 includes:

Step c21, determining a target point of presence corresponding to the target egress gateway.

Step c22, sending the second data request message to the target egress gateway based on the target point of presence and the destination address of the second data request message.

It should be noted that multiple points of presence are provided in the SD-WAN, and each point of presence corresponds to one or more egress gateways. In practical operations, the correspondence between each egress gateway and the point of presence may be acquired to query the target point of presence corresponding to the target egress gateway.

Specifically, the client of the security management application sends the second data request message to the target point of presence, and then the target point of presence forwards the second data request message to the target egress gateway based on the destination address of the second data request message.

In the traffic scheduling method provided in this embodiment, the second data request message is sent to the target egress gateway through the target point of presence corresponding to the target egress gateway. Therefore, the data flow of the second data request message can be controlled by using the target point of presence to improve the accuracy of data transmission.

In some optional implementations, replacing the source address of the first response message based on the virtual network address and the first target network address recorded in the first response message to obtain the target response message in the above step S4044 includes:

Step d1, replacing the source address in the first response message with the first target network address based on the first target network address recorded in the first response message to obtain a second response message; and Step d2, replacing the source address of the second response message with the virtual network address to obtain the target response message.

In the traffic scheduling method provided in this embodiment, when the client of the security management application or the CPE in the region where the client is located receives the first response message, it first replaces the source address in the first response message with the first target network address based on the first target network address recorded in the first response message to obtain the second response message. Then, the source address of the second response message is further replaced with the virtual network address to obtain the target response message. Therefore, the first target network address of the target server-side can be hidden by using the virtual network address, so that it is difficult for the external network to directly access the resource of the target server-side, thereby improving the security of data transmission.

Figure 5:
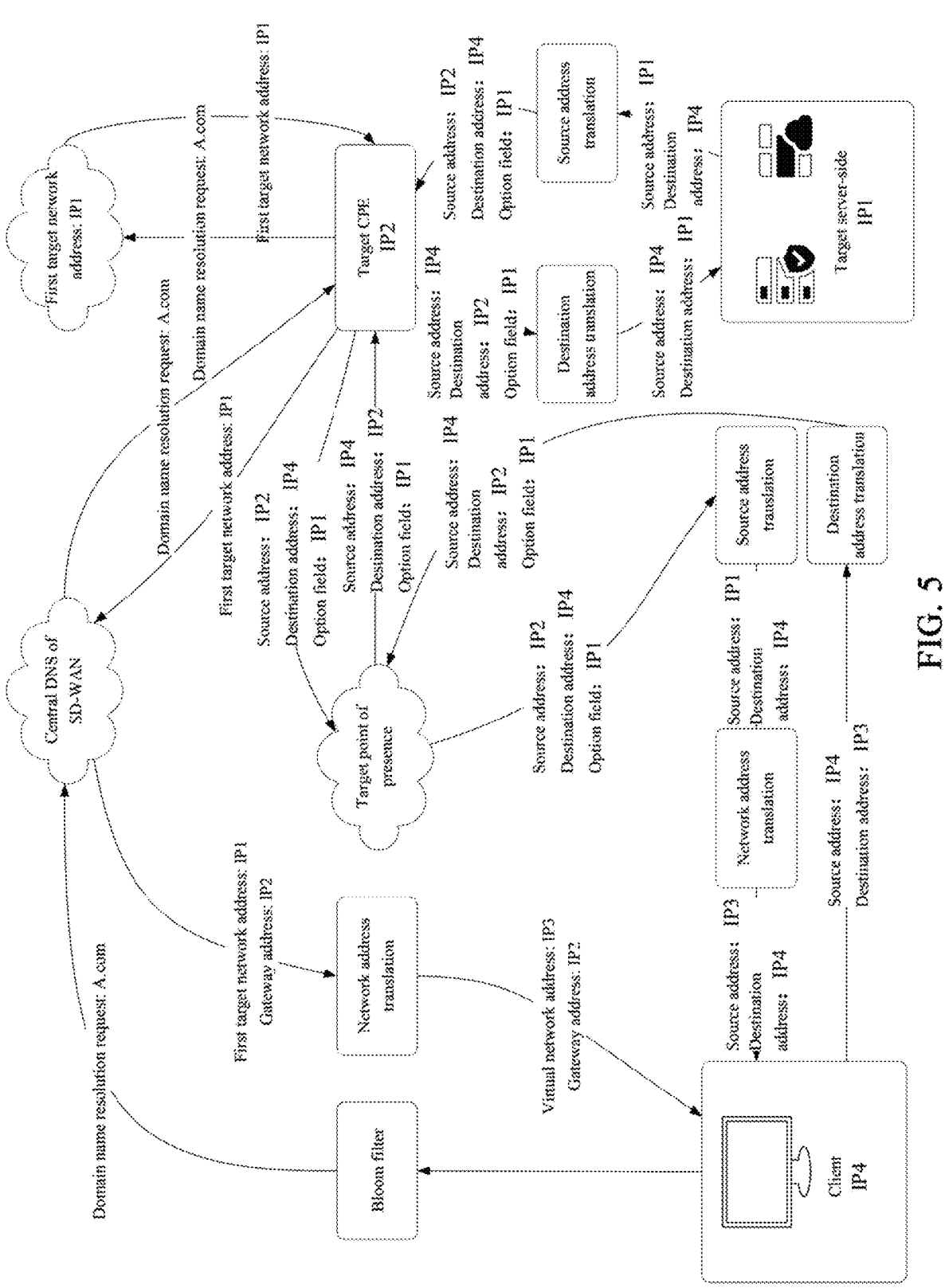
FIG. 5 is a schematic flowchart of a data forwarding process according to an embodiment of the present disclosure.

Exemplarily, assuming that the target domain name of the business application A is A.com, the first target network address corresponding to A.com is IP1, the gateway address of the target egress gateway is IP2, the virtual network address corresponding to IP1 is IP3, and the network address of the client of the security management application is IP4. Taking the central domain name system as the central DNS of SD-WAN and the target egress gateway as the target CPE in the same region as the target server-side corresponding to A.com as an example. As shown in FIG. 5, when the client of the security management application needs to schedule data request traffic of A.com, in order to avoid the external network from directly accessing the resource of the target server-side, the client determines the data request message to be transmitted based on the data request of the business application A when receiving the data request of the business application A, and uses IP3 as the destination address of the data request message to be transmitted and IP4 as the source address of the data request message to be transmitted to generate the first data request message. Further, the client of the security management application performs destination network address translation on the first data request message, replaces the destination address of the first data request message with IP2, and records IP1 in the option field of the first data request message to obtain the second data request message. The client of the security management application sends the second data request message to the target point of presence, and forwards the second data request message to the target CPE corresponding to the target server-side through the target point of presence. The target CPE performs destination network address translation on the second data request message based on IP1 recorded in the option field of the second data request message, and replaces the destination address of the second data request message with IP1 to obtain the third data request message. The target egress gateway feeds back the third data request message to the target server-side. The target server-side generates a response message based on the third data request message. At this time, the source address of the response message is IP1, and the destination address of the response message is IP4. The target server-side feeds back the response message to the target CPE, and the target CPE replaces the source address of the response message with IP2 and records IP1 in the option field of the response message to obtain the first response message. The target CPE sends the first response message to the target point of presence, and feeds back the first response message to the client of the security management application through the target point of presence. The client of the security management application performs source address translation on the first response message based on IP1 recorded in the option field of the first response message, and replaces the source address of the first response message with IP1 to obtain the second response message. Further, the client of the security management application performs network address translation on the second response message, and replaces the source address of the second response message with IP3 to obtain the target response message, and feeds back the target response message to the business application A, so that the business application A acquires the related application resource.

Figure 6:
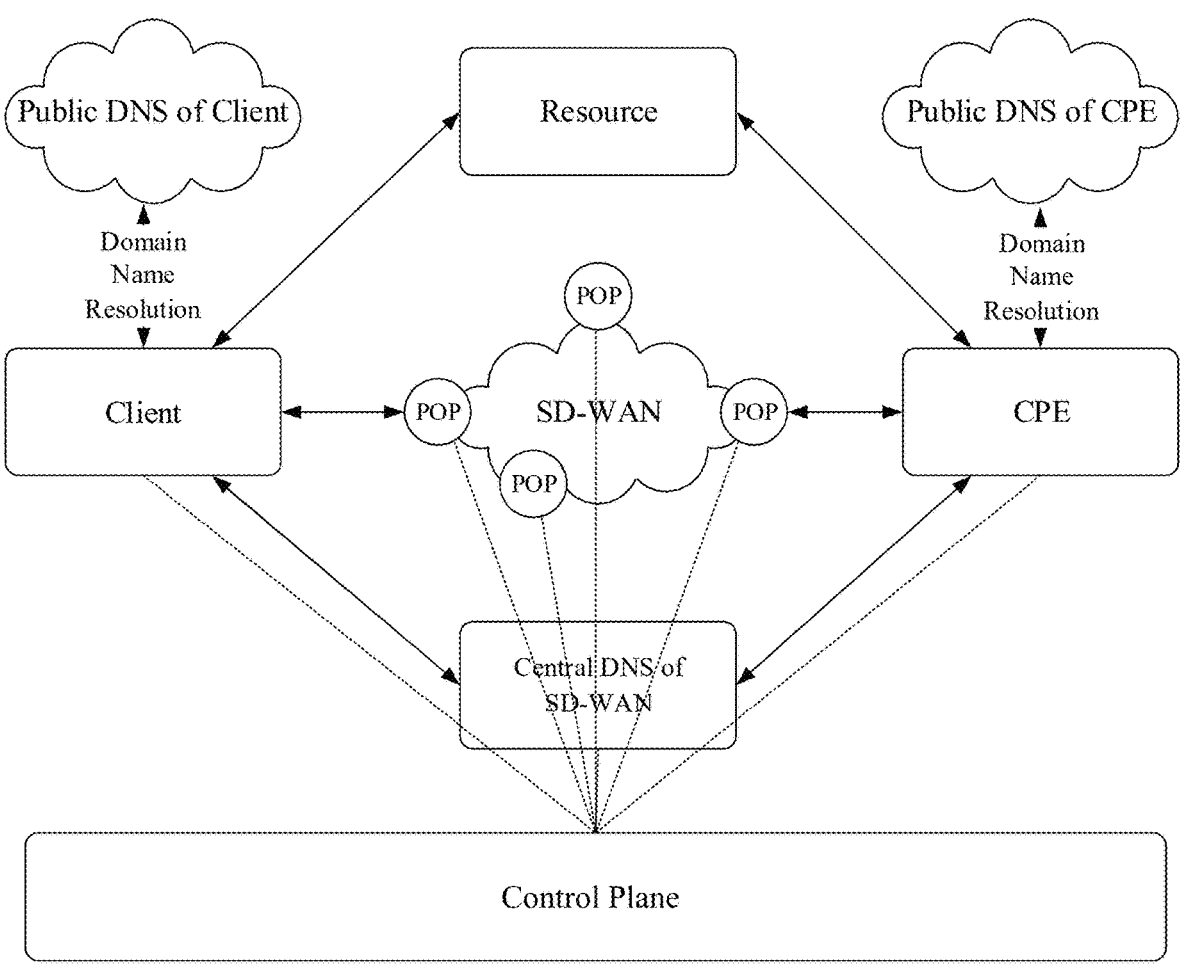
FIG. 6 is a schematic diagram of another network architecture based on SD-WAN according to an embodiment of the present disclosure.

Taking the SD-WAN to which the traffic scheduling method of the present disclosure is applied as an example, as shown in FIG. 6, the network architecture based on SD-WAN adopted in the present disclosure at least includes a control plane, a client of a security management application, a central domain name system, a first domain name resolution server, a second domain name resolution server, an egress gateway (that is, a CPE used to access server-side resources of a business application), and a point of presence (POP). The control plane is connected to the client, the central domain name system, the egress gateway, and the POP. The control plane uniformly manages each client, the egress gateway, and the POP. For example, the related person configures a domain name of the business application and gateway information of the corresponding egress gateway according to actual needs in the control plane, respectively, and the control plane uniformly delivers the configured content to components such as each client, the central domain name system, the egress gateway, and the POP.

When a user wants to access a resource of any business application, a client of a security management application parses a domain name resolution request sent by the business application based on the traffic scheduling method of the present disclosure to obtain a domain name resolution result. If the domain name resolution result is fed back through the central domain name system, it indicates that the data request message corresponding to the business application needs to be scheduled through components such as an access point of the SD-WAN. For the data request message that needs to be scheduled, the client of the security management application performs destination address translation on the data request message based on the traffic scheduling method of the present disclosure to send the data request message to the corresponding access point of the SD-WAN, forward the data request message to the target egress gateway through the access point of the SD-WAN, and forward the data request message to the corresponding target server-side by the target egress gateway. Then, the response message fed back by the target server-side is fed back to the client of the security management application through the target egress gateway. The source address of the response message is replaced by the client of the security management application, and the finally obtained target response message is fed back to the business application.

It is worth noting that compared with the domain name-based traffic scheduling scheme in the related art, the traffic scheduling method of the present disclosure can effectively reduce the frequency of the SD-WAN controller to change the flow table and avoid the SD-WAN controller from maintaining a large amount of 5-tuple information through the destination address translation technology. In addition, through the source address translation technology, the data of the target server-side received by the target egress gateway is fed back to the client of the security management application and the business application on the terminal device where the client is located through the standard domain name resolution protocol, which can effectively reduce the user configuration cost and the client access cost. In addition, when performing domain name resolution on the target domain name, the domain name resolution request is forwarded to the target egress gateway: so that the first domain name resolution server corresponding to the target egress gateway is used for domain name resolution, which can effectively avoid the problem of dynamic changes of the network address caused by the content delivery network, so as to resolve the first target network address closer to the target egress gateway (or the server-side corresponding to the target domain name to be accessed), thereby effectively reducing the access delay in the traffic scheduling process. In addition, because the traffic scheduling method of the present disclosure performs traffic scheduling based on the configuration relationship between the domain name and the target egress gateway, finer-grained traffic scheduling can be performed by further combining the device information or geographical location of the terminal device where the client is located according to actual needs, for example, device information n and domain name A.com access egress gateway N, device information m and domain name A.com access egress gateway M, and the like.

In this embodiment, there is also provided a traffic scheduling apparatus, which is configured to implement the above-mentioned embodiments and preferred implementations, and details will not be repeated here. As used below, the term "module" may implement a combination of software and/or hardware for a predetermined function. Although the apparatus described in the following embodiments is preferably implemented in software, it is also possible and contemplated to implement it in hardware, or a combination of software and hardware.

Figures 7, 8:
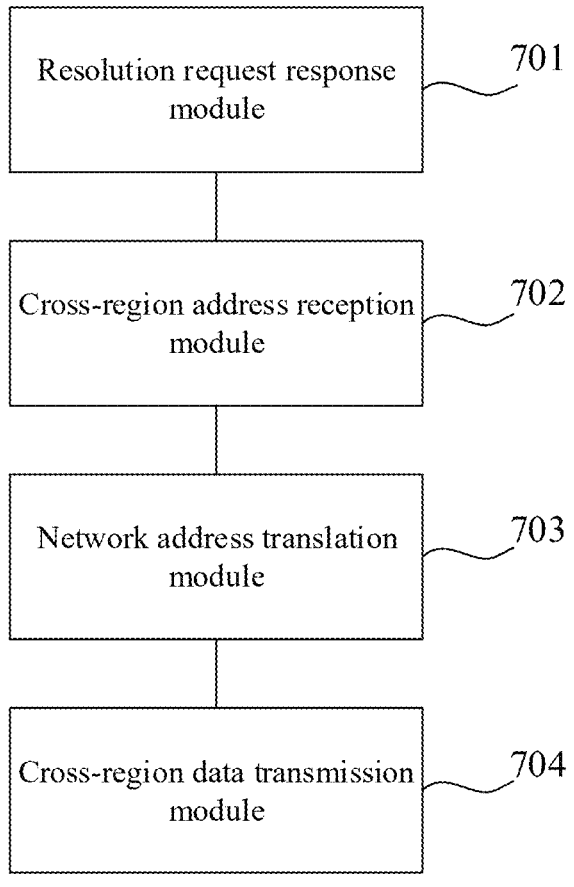
FIG. 7 is a structural block diagram of a traffic scheduling apparatus according to an embodiment of the present disclosure.
FIG. 8 is a structural block diagram of a computer device according to an embodiment of the present disclosure.

This embodiment provides a traffic scheduling apparatus, as shown in FIG. 7, including:

a resolution request response module 701, configured to in response to a domain name resolution request of a business application, forward the domain name resolution request to a central domain name system, wherein the domain name resolution request carries a target domain name of the business application, the central domain name system is configured to forward the domain name resolution request to a target egress gateway corresponding to the target domain name, and the central domain name system is preconfigured with gateway information of egress gateways corresponding to a plurality of domain names:

a cross-region address reception module 702, configured to receive a first target network address and a gateway address of the target egress gateway that are fed back by the central domain name system, wherein the first target network address is obtained by the target egress gateway by sending the domain name resolution request to a corresponding first domain name resolution server for domain name resolution:

a network address translation module 703, configured to perform network address translation on the first target network address to obtain a virtual network address; and a cross-region data transmission module 704, configured to perform data transmission based on the virtual network address, the gateway address, and the first target network address.

In some optional implementations, the resolution request response module 701 includes:

a scheduling condition determination unit, configured to acquire a scheduling condition of the target domain name; and a cross-region domain name sending unit, configured to: in response to the target domain name being a domain name to be scheduled, send the domain name resolution request to the central domain name system.

In some optional implementations, the scheduling condition determination unit includes:

a domain name acquisition sub-unit, configured to acquire a plurality of domain names to be scheduled.

A domain name matching sub-unit is configured to obtain the scheduling condition of the target domain name based on a matching result of the target domain name and the plurality of domain names to be scheduled.

In some optional implementations, the plurality of domain names to be scheduled are encapsulated into a Bloom filter, and the Bloom filter is used to indicate the existence of the plurality of domain names to be scheduled. The domain name matching sub-unit is further configured to:

perform a Bloom calculation on the target domain name and the Bloom filter to obtain the matching result of the target domain name and the plurality of domain names to be scheduled; and determine the scheduling condition of the target domain name based on the matching result.

In some optional implementations, the traffic scheduling apparatus further includes:

a local domain name sending module, configured to: in response to the target domain name not being the domain name to be scheduled, send the domain name resolution request to a second domain name resolution server corresponding to a client of a security management application in the software defined wide area network.

a local domain name resolution module, configured to receive a second target network address that is fed back by the second domain name resolution server, wherein the second target network address is obtained by the second domain name resolution server by performing domain name resolution on the domain name resolution request; and a local traffic scheduling module, configured to perform data transmission based on the second target network address.

In some optional implementations, the network address translation module 703 includes:

a first address selection unit, configured to determine an unused preset network address from a plurality of preset network addresses; and a second address selection unit, configured to determine the virtual network address based on a network planning sequence of the unused preset network address.

In some optional implementations, the cross-region data transmission module 704 includes:

a data request generation unit, configured to: in response to a data request of the business application, determine a data request message to be transmitted based on the data request, and use the virtual network address as a destination address of the data request message to be transmitted to generate a first data request message:

a data request forwarding unit, configured to replace the destination address of the first data request message based on the gateway address and the first target network address, to send, by using the target egress gateway, a data request message with the destination address replaced to a target server-side corresponding to the first target network address:

a response data reception unit, configured to receive a first response message that is fed back by the target egress gateway, wherein the first response message is obtained by the target egress gateway by replacing a source address of a response message that is fed back by the target server-side with the gateway address and recording the first target network address in the response message:

a response data processing unit, configured to replace a source address of the first response message based on the virtual network address and the first target network address recorded in the first response message to obtain a target response message; and a response data feedback unit, configured to feed back the target response message to the business application.

In some optional implementations, the data request forwarding unit includes:

a destination address replacement sub-unit, configured to replace the destination address of the first data request message with the gateway address, and record the first target network address in the first data request message to obtain a second data request message; and a data request forwarding sub-unit, configured to send the second data request message to the target egress gateway based on the destination address of the second data request message, wherein the target egress gateway is configured to replace the destination address of the second data request message with the first target network address based on the first target network address recorded in the second data request message to send the second data request message to the target server-side.

In some optional implementations, the data request forwarding sub-unit is further configured to:

determine a target point of presence corresponding to the target egress gateway; and send the second data request message to the target egress gateway based on the target point of presence and the destination address of the second data request message.

In some optional implementations, the response data processing unit includes:

a first source address adjustment sub-unit, configured to replace the source address in the first response message with the first target network address based on the first target network address recorded in the first response message to obtain a second response message; and a second source address adjustment sub-unit, configured to replace the source address of the second response message with the virtual network address to obtain the target response message.

Further function descriptions of the above-mentioned modules and units are the same as the corresponding embodiments described above, and will not be repeated here.

The traffic scheduling apparatus in this embodiment is presented in the form of functional units, wherein the unit refers to an application specific integrated circuit (ASIC), a processor and a memory that execute one or more software or fixed programs, and/or other devices that can provide the above functions.

An embodiment of the present disclosure further provides a computer device, which includes the traffic scheduling apparatus shown in FIG. 7 above.

Please refer to FIG. 8, which is a structural block diagram of a computer device provided by an optional embodiment of the present disclosure. As shown in FIG. 8, the computer device includes: one or more processors 801, a memory 802, and interfaces for connecting various components, including high-speed interfaces and low-speed interfaces. Various components communicate with each other by using different buses, and may be installed on a common main board or installed in other ways as required. The processor may process instructions executed in the computer device, including instructions stored in the memory or on the memory to display graphic information of a GUI on an external input/output apparatus (such as a display device coupled to the interface). In some optional implementations, if necessary: multiple processors and/or multiple buses may be used together with multiple memories and multiple memories. Likewise, multiple computer devices may be connected, and each device provides part of the necessary operations (for example, as a server array, a group of blade servers, or a multiprocessor system). FIG. 8 takes one processor 801 as an example.

The processor 801 may be a central processing unit, a network processor, or a combination thereof. The processor 801 may further include a hardware chip. The above hardware chip may be an application specific integrated circuit, a programmable logic device, or a combination thereof. The above programmable logic device may be a complex programmable logic device, a field programmable gate array: a generic array logic, or any combination thereof.

The memory 802 stores instructions executable by at least one processor 801, so that the at least one processor 801 executes the method shown in the above embodiments.

The memory 802 may include a program storage area and a data storage area, wherein the program storage area may store an operating system and clients required for at least one function; and the data storage area may store data created according to the use of the computer device, and the like. In addition, the memory 802 may include a high-speed random-access memory, and may also include a non-transitory memory, such as at least one magnetic disk storage device, a flash device, or other non-transitory solid-state storage devices. In some optional implementations, the memory 802 may optionally include memories that are remotely set with respect to the processor 801, and these remote memories may be connected to the computer device through a network. Examples of the above network include but are not limited to the Internet, an intranet, a local area network, a mobile communication network, and a combination thereof.

The memory 802 may include a volatile memory, such as a random-access memory: the memory may also include a non-volatile memory, such as a flash memory, a hard disk or a solid-state drive; and the memory 802 may also include a combination of the above-mentioned types of memories.

The computer device further includes an input apparatus 803 and an output apparatus 804. The processor 801, the memory 802, the input apparatus 803, and the output apparatus 804 may be connected by a bus or in other manners, and FIG. 8 takes connection by a bus as an example.

The input apparatus 803 may receive input digital or character information and generate key signal input related to user settings and function control of the computer device, such as a touch screen, a keypad, a mouse, a trackpad, a touchpad, an indicator rod, one or more mouse buttons, a trackball, a joystick, and the like. The output apparatus 804 may include a display device, an auxiliary lighting apparatus (for example, an LED), a tactile feedback apparatus (for example, a vibration motor), and the like. The above display device includes but is not limited to a liquid crystal display: a light emitting diode, a display, and a plasma display: In some optional implementations, the display device may be a touch screen.

Embodiments of the present disclosure further provide a computer-readable storage medium. The above methods according to embodiments of the present disclosure may be implemented in hardware or firmware, or implemented as computer code that may be recorded on a storage medium, or implemented as computer code that is originally stored in a remote storage medium or a non-transitory machine-readable storage medium and downloaded through a network and will be stored in a local storage medium, so that the methods described herein may be stored in such software processing on a storage medium using a general-purpose computer, a dedicated processor, or programmable or dedicated hardware. The storage medium may be a magnetic disk, an optical disk, a read-only memory, a random-access memory, a flash memory, a hard disk, a solid-state drive, or the like; further, the storage medium may also include a combination of the above-mentioned types of memories. It may be understood that a computer, a processor, a microprocessor controller, or programmable hardware includes a storage component that may store or receive software or computer code, and when the software or computer code is accessed and executed by the computer, the processor, or the hardware, the methods shown in the above embodiments are implemented.

A part of the present disclosure may be applied as a computer program product, such as computer program instructions, which, when executed by a computer, may call or provide the methods and/or technical solutions according to the present disclosure through operations of the computer. Those skilled in the art should understand that the existence forms of computer program instructions in a computer-readable medium include, but are not limited to, a source file, an executable file, an installation package file, etc. Correspondingly, the manners in which computer program instructions are executed by a computer include, but are not limited to, the computer directly executes the instructions, or the computer compiles the instructions and then executes the corresponding compiled program, or the computer reads and executes the instructions, or the computer reads and installs the instructions and then executes the corresponding post-installation program. Here, the computer-readable medium may be any available computer-readable storage medium or communication medium accessible by the computer.

Although the embodiments of the present disclosure have been described in conjunction with the drawings, those skilled in the art may make various modifications and variations without departing from the spirit and scope of the present disclosure, and such modifications and variations all fall within the scope defined by the appended claims.

What is claimed is:

1. A traffic scheduling method, wherein the method is applied to a software defined wide area network, and the method comprises:

in response to a domain name resolution request of a business application, forwarding the domain name resolution request to a central domain name system, wherein the domain name resolution request carries a target domain name of the business application, the central domain name system is configured to forward the domain name resolution request to a target egress gateway corresponding to the target domain name, and the central domain name system is preconfigured with gateway information of egress gateways corresponding to a plurality of domain names;

receiving a first target network address and a gateway address of the target egress gateway that are fed back by the central domain name system, wherein the first target network address is obtained by the target egress gateway by sending the domain name resolution request to a corresponding first domain name resolution server for domain name resolution;

performing network address translation on the first target network address to obtain a virtual network address; and performing data transmission based on the virtual network address, the gateway address, and the first target network address.

2. The traffic scheduling method according to claim 1, wherein forwarding the domain name resolution request to the central domain name system comprises:

acquiring a scheduling condition of the target domain name; and in response to the target domain name being a domain name to be scheduled, sending the domain name resolution request to the central domain name system.

3. The traffic scheduling method according to claim 2, wherein acquiring the scheduling condition of the target domain name comprises:

acquiring a plurality of domain names to be scheduled; and obtaining the scheduling condition of the target domain name based on a matching result of the target domain name and the plurality of domain names to be scheduled.

4. The traffic scheduling method according to claim 3, wherein the plurality of domain names to be scheduled are encapsulated into a Bloom filter, and the Bloom filter is used to indicate the existence of the plurality of domain names to be scheduled, and obtaining the scheduling condition of the target domain name based on the matching result of the target domain name and the plurality of domain names to be scheduled comprises:

performing a Bloom calculation on the target domain name and the Bloom filter to obtain the matching result of the target domain name and the plurality of domain names to be scheduled; and determining the scheduling condition of the target domain name based on the matching result.

5. The traffic scheduling method according to claim 2, wherein the method further comprises:

in response to the target domain name not being the domain name to be scheduled, sending the domain name resolution request to a second domain name resolution server corresponding to a client of a security management application in the software defined wide area network;

receiving a second target network address that is fed back by the second domain name resolution server, wherein the second target network address is obtained by the second domain name resolution server by performing domain name resolution on the domain name resolution request; and performing data transmission based on the second target network address.

6. The traffic scheduling method according to claim 1, wherein performing the network address translation on the first target network address to obtain the virtual network address comprises:

determining an unused preset network address from a plurality of preset network addresses; and determining the virtual network address based on a network planning sequence of the unused preset network address.

7. The traffic scheduling method according to claim 1, wherein performing the data transmission based on the virtual network address, the gateway address, and the first target network address comprises:

in response to a data request of the business application, determining a data request message to be transmitted based on the data request, and using the virtual network address as a destination address of the data request message to be transmitted to generate a first data request message;

replacing the destination address of the first data request message based on the gateway address and the first target network address, to send, by using the target egress gateway; a data request message with the destination address replaced to the target server-side corresponding to the first target network address;

receiving a first response message that is fed back by the target egress gateway, wherein the first response message is obtained by the target egress gateway by replacing a source address of a response message that is fed back by the target server-side with the gateway address and recording the first target network address in the response message;

replacing a source address of the first response message based on the virtual network address and the first target network address recorded in the first response message to obtain a target response message; and feeding back the target response message to the business application.

8. The traffic scheduling method according to claim 7, wherein replacing the destination address of the first data request message based on the gateway address and the first target network address to send, by using the target egress gateway; the data request message with the destination address replaced to the target server-side corresponding to the first target network address comprises:

replacing the destination address of the first data request message with the gateway address, and recording the first target network address in the first data request message to obtain a second data request message; and sending the second data request message to the target egress gateway based on the destination address of the second data request message, wherein the target egress gateway is configured to replace the destination address of the second data request message with the first target network address based on the first target network address recorded in the second data request message to send the second data request message to the target server-side.

9. The traffic scheduling method according to claim 8, wherein sending the second data request message to the target egress gateway based on the destination address of the second data request message comprises:

determining a target point of presence corresponding to the target egress gateway; and sending the second data request message to the target egress gateway based on the target point of presence and the destination address of the second data request message.

10. The traffic scheduling method according to claim 7, wherein replacing the source address of the first response message based on the virtual network address and the first target network address recorded in the first response message to obtain the target response message comprises:

replacing the source address in the first response message with the first target network address based on the first target network address recorded in the first response message to obtain a second response message; and replacing the source address of the second response message with the virtual network address to obtain the target response message.

11. A computer device, comprising:

a memory and a processor, wherein the memory and the processor communicate with each other, the memory has computer instructions stored therein, and the processor executes the computer instructions to thereby execute a traffic scheduling method comprising:

in response to a domain name resolution request of a business application, forwarding the domain name resolution request to a central domain name system, wherein the domain name resolution request carries a target domain name of the business application, the central domain name system is configured to forward the domain name resolution request to a target egress gateway corresponding to the target domain name, and the central domain name system is preconfigured with gateway information of egress gateways corresponding to a plurality of domain names;

receiving a first target network address and a gateway address of the target egress gateway that are fed back by the central domain name system, wherein the first target network address is obtained by the target egress gateway by sending the domain name resolution request to a corresponding first domain name resolution server for domain name resolution;

performing network address translation on the first target network address to obtain a virtual network address; and performing data transmission based on the virtual network address, the gateway address, and the first target network address.

12. The computer device according to claim 11, wherein forwarding the domain name resolution request to the central domain name system comprises:

acquiring a scheduling condition of the target domain name; and in response to the target domain name being a domain name to be scheduled, sending the domain name resolution request to the central domain name system.

13. The computer device according to claim 12, wherein acquiring the scheduling condition of the target domain name comprises:

acquiring a plurality of domain names to be scheduled; and obtaining the scheduling condition of the target domain name based on a matching result of the target domain name and the plurality of domain names to be scheduled.

14. The computer device according to claim 13, wherein the plurality of domain names to be scheduled are encapsulated into a Bloom filter, and the Bloom filter is used to indicate the existence of the plurality of domain names to be scheduled, and obtaining the scheduling condition of the target domain name based on the matching result of the target domain name and the plurality of domain names to be scheduled comprises:

performing a Bloom calculation on the target domain name and the Bloom filter to obtain the matching result of the target domain name and the plurality of domain names to be scheduled; and determining the scheduling condition of the target domain name based on the matching result.

15. The computer device according to claim 12, wherein the method further comprises:

in response to the target domain name not being the domain name to be scheduled, sending the domain name resolution request to a second domain name resolution server corresponding to a client of a security management application in the software defined wide area network;

receiving a second target network address that is fed back by the second domain name resolution server, wherein the second target network address is obtained by the second domain name resolution server by performing domain name resolution on the domain name resolution request; and performing data transmission based on the second target network address.

16. The computer device according to claim 11, wherein performing the network address translation on the first target network address to obtain the virtual network address comprises:

determining an unused preset network address from a plurality of preset network addresses; and determining the virtual network address based on a network planning sequence of the unused preset network address.

17. The computer device according to claim 11, wherein performing the data transmission based on the virtual network address, the gateway address, and the first target network address comprises:

in response to a data request of the business application, determining a data request message to be transmitted based on the data request, and using the virtual network address as a destination address of the data request message to be transmitted to generate a first data request message;

replacing the destination address of the first data request message based on the gateway address and the first target network address, to send, by using the target egress gateway, a data request message with the destination address replaced to the target server-side corresponding to the first target network address;

receiving a first response message that is fed back by the target egress gateway, wherein the first response message is obtained by the target egress gateway by replacing a source address of a response message that is fed back by the target server-side with the gateway address and recording the first target network address in the response message;

replacing a source address of the first response message based on the virtual network address and the first target network address recorded in the first response message to obtain a target response message; and feeding back the target response message to the business application.

18. The computer device according to claim 17, wherein replacing the destination address of the first data request message based on the gateway address and the first target network address to send, by using the target egress gateway, the data request message with the destination address replaced to the target server-side corresponding to the first target network address comprises:

replacing the destination address of the first data request message with the gateway address, and recording the first target network address in the first data request message to obtain a second data request message; and sending the second data request message to the target egress gateway based on the destination address of the second data request message, wherein the target egress gateway is configured to replace the destination address of the second data request message with the first target network address based on the first target network address recorded in the second data request message to send the second data request message to the target server-side.

19. The computer device according to claim 18, wherein sending the second data request message to the target egress gateway based on the destination address of the second data request message comprises:

determining a target point of presence corresponding to the target egress gateway; and sending the second data request message to the target egress gateway based on the target point of presence and the destination address of the second data request message.

20. A non-transitory computer-readable storage medium, wherein the computer-readable storage medium has computer instructions stored thereon, and the computer instructions are used to cause a computer to execute a traffic scheduling method comprising:

in response to a domain name resolution request of a business application, forwarding the domain name resolution request to a central domain name system, wherein the domain name resolution request carries a target domain name of the business application, the central domain name system is configured to forward the domain name resolution request to a target egress gateway corresponding to the target domain name, and the central domain name system is preconfigured with gateway information of egress gateways corresponding to a plurality of domain names;

receiving a first target network address and a gateway address of the target egress gateway that are fed back by the central domain name system, wherein the first target network address is obtained by the target egress gateway by sending the domain name resolution request to a corresponding first domain name resolution server for domain name resolution;

performing network address translation on the first target network address to obtain a virtual network address; and performing data transmission based on the virtual network address, the gateway address, and the first target network address.

* * * * *